(12) United States Patent
Tadokoro

(10) Patent No.: US 11,341,042 B2
(45) Date of Patent: May 24, 2022

(54) STORAGE APPARATUS CONFIGURED TO MANAGE A CONVERSION TABLE ACCORDING TO A REQUEST FROM A HOST

(71) Applicant: KIOXIA CORPORATION, Tokyo (JP)

(72) Inventor: Mitsunori Tadokoro, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/008,529

(22) Filed: Aug. 31, 2020

(65) Prior Publication Data
US 2021/0294738 A1  Sep. 23, 2021

(30) Foreign Application Priority Data

Mar. 19, 2020  (JP) .............................. JP2020-049112

(51) Int. Cl.
*G06F 12/02* (2006.01)
*G06F 12/0871* (2016.01)
*G06F 13/16* (2006.01)
*G06F 12/0831* (2016.01)

(52) U.S. Cl.
CPC ...... *G06F 12/0246* (2013.01); *G06F 12/0833* (2013.01); *G06F 12/0871* (2013.01); *G06F 13/1668* (2013.01); *G06F 2212/7201* (2013.01)

(58) Field of Classification Search
CPC ............. G06F 12/0246; G06F 12/0871; G06F 13/1668; G06F 12/0833; G06F 2212/7201
See application file for complete search history.

(56) References Cited

U.S. PATENT DOCUMENTS

| | | | |
|---|---|---|---|
| 9,268,682 B2 | 2/2016 | Tomlin et al. | |
| 2012/0069029 A1* | 3/2012 | Bourd | G06T 1/60 |
| | | | 345/502 |
| 2016/0011782 A1 | 1/2016 | Kurotsuchi et al. | |
| 2017/0068621 A1* | 3/2017 | Watanabe | G06F 12/0871 |
| 2019/0034114 A1 | 1/2019 | Natarajan et al. | |
| 2019/0042462 A1 | 2/2019 | Zhang et al. | |
| 2020/0098423 A1* | 3/2020 | Huang | G11C 11/5642 |

OTHER PUBLICATIONS

Jeong et.all "Improving Flash Storage Performance by Caching Address Mapping Table in Host Memory" 2017 (Year: 2017).*

* cited by examiner

*Primary Examiner* — Tasnima Matin
(74) *Attorney, Agent, or Firm* — Kim & Stewart LLP

(57) ABSTRACT

A storage apparatus includes a storage device that stores a table mapping a logical address to a physical address and a controller that manages the table and controls write of data to and read of data from the storage device according to a request from a host. The controller allocates, in a memory, a cache area for temporarily storing a part of the table, and a write buffer area for storing a part of the table that has been updated by the host and is to be written to the storage device, upon receipt of a request that requires update of the table from the host, determines whether a first part of the table to be updated is in the write buffer area, and upon determining that the first part is in the write buffer area, updates the first part in the write buffer area according to the request.

16 Claims, 10 Drawing Sheets

STORAGE APPARATUS CONFIGURED TO MANAGE A CONVERSION TABLE ACCORDING TO A REQUEST FROM A HOST

CROSS-REFERENCE TO RELATED APPLICATION

This application is based upon and claims the benefit of priority from Japanese Patent Application No. 2020-049112, filed Mar. 19, 2020, the entire contents of which are incorporated herein by reference.

FIELD

Embodiments described herein relate generally to a storage apparatus, a control method for a cache of a conversion table, and a storage system.

BACKGROUND

In a storage apparatus, mapping of a logical address of a storage area to a physical address corresponding to an actual location in the storage device is managed with tables or the like. The mapping between the logical address and the physical address is stored as an address conversion table which is also called a lookup table (LUT).

In recent years, the size of the LUT tends to increase with increases in the capacity of the storage device. There is a strong preference for preventing an increase in a size of the data area used for caching the LUT. For this reason, caching only a part of the LUT has become common. However, when caching only a part of an LUT, a storage device needs to perform cache control without increasing latency.

DETAILED DESCRIPTION

Embodiments provide a storage device and a cache control method of an address conversion table for which cache control of an address conversion table can be performed without a deterioration (increase) in latency.

In general, according to one embodiment, a storage apparatus includes a storage device that stores a conversion table that maps a logical address to a physical address of the storage device. The storage apparatus further includes a controller configured to manage the conversion table and control write of data to the storage device and read of the data from the storage device according to a request from a host. The controller allocates, in a memory of the host or the storage apparatus, a cache area for temporarily storing a part of the conversion table, and a write buffer area for storing a part of the conversion table that has been updated by the host and is to be written to the storage device. Upon receipt of a request that requires update of the conversion table from the host, the controller determines whether a first part of the conversion table to be updated is in the write buffer area. Upon determining that the first part is in the write buffer area, the controller updates the first part in the write buffer area according to the request.

Hereinafter, example embodiments will be described with reference to the accompanying drawings.

Figure 1:
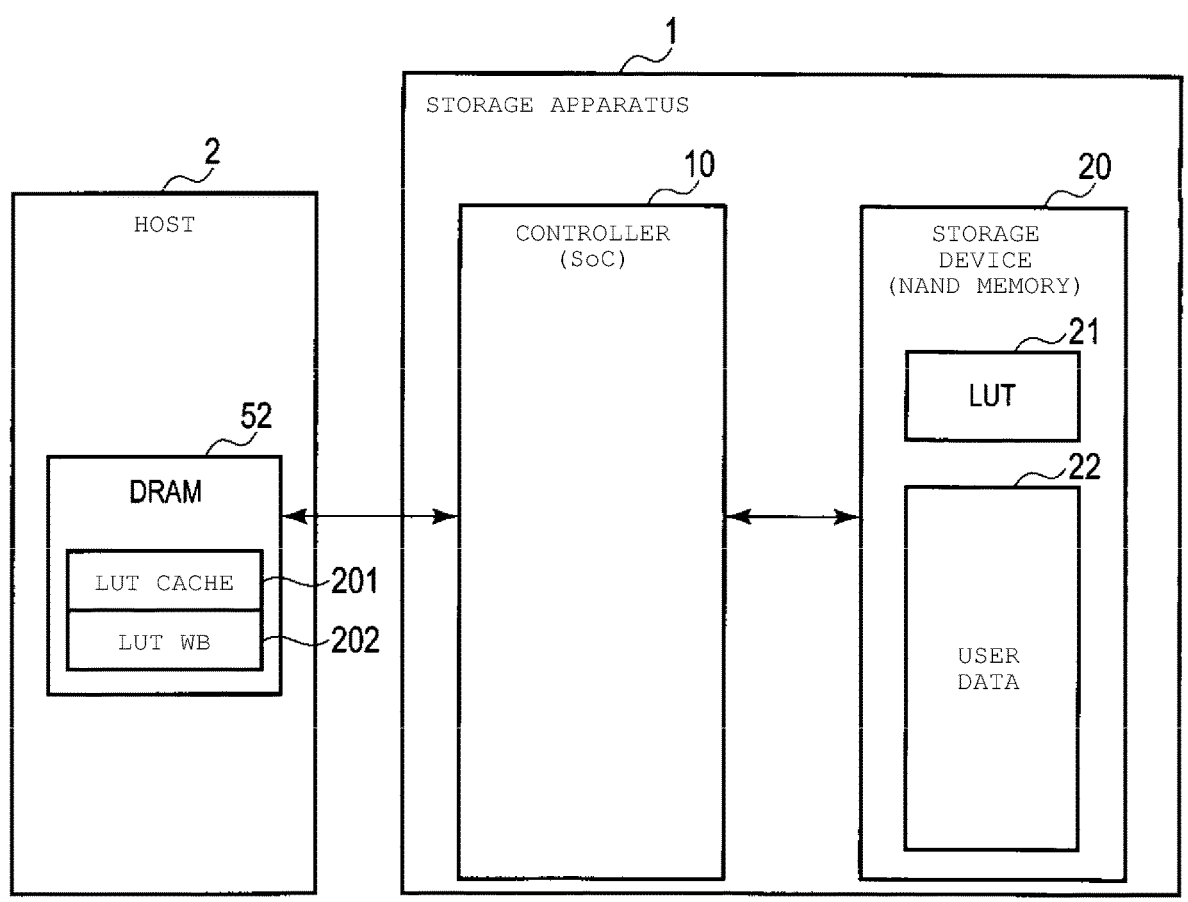
FIG. 1 is a diagram showing a storage apparatus according to a first embodiment.

FIG. 1 is a diagram showing a storage apparatus 1 according to a first embodiment. The storage apparatus 1 is, for example, a Solid State Drive (SSD). The storage apparatus 1 is connected to a host 2, which is an external information processing device, through an interface such as PCI Express (PCIe, registered trademark). The storage apparatus 1 and the host 2 may make up a storage system. The host 2 is, for example, a personal computer (PC) or a server. In addition, the host 2 also includes a Dynamic Random-Access Memory (DRAM) 52. The DRAM 52 is a high-speed memory, compared to a storage device 20 of the storage apparatus 1.

The storage apparatus 1 includes a controller 10, which is implemented by, for example, a System On Chip (SoC), and the storage device 20.

When the controller 10 receives a write request (or write command) for writing user data, the controller 10 controls the storage device 20 to write the received user data. In addition, when the controller 10 receives a read request (or read command) for reading the user data, the controller 10 controls the storage device 20 to read the requested user data. In addition, the controller 10 converts a logical address specified in the received write command or the read command into a physical address indicating an actual location on the storage device 20. The logical address is an address indicating a location on a storage area of the storage device 20. The conversion from the logical address to the physical address is referred to as address conversion or the like.

The storage device 20 is, for example, a NAND-type flash memory (NAND memory). The storage device 20 stores a lookup table (LUT) 21 and user data 22. The LUT 21 stores mapping of the logical address and the physical address. The user data 22 is data stored in the storage device 20 written by the write command. In addition, the user data 22 may be read by the read command issued by the host 2.

The storage apparatus 1 allocates a cache area (LUT cache 201) and a write buffer (LUT WB 202) in the DRAM 52 of the host 2. The LUT cache 201 is allocated in the DRAM 52 of the host 2 as a set associative (N-way) cache area. The storage apparatus 1 causes the LUT cache 201 to temporarily store a part of the LUT 21. Hereinafter, the part of the LUT 21 stored in the LUT cache 201 is referred to as a partial LUT. In addition, the storage apparatus 1 uses the LUT WB 202 to efficiently perform cache control. Access from the storage apparatus 1 to the DRAM 52 of the host 2 may be executed, for example, according to a procedure in conformity with the Unified Memory Extension (UME) standard which is an optional function of a Universal Flash Storage (UFS) standard. In addition, when an SSD conforms to the NVM Express (NVNe) standard, the procedure is executed in conformity with the Host Memory Buffer (HMB) standard. Hereinafter, the cache control, which is executed by the storage apparatus 1, for the LUT 21 using the LUT cache 201 and the LUT WB 202 will be described in detail.

Figure 2:
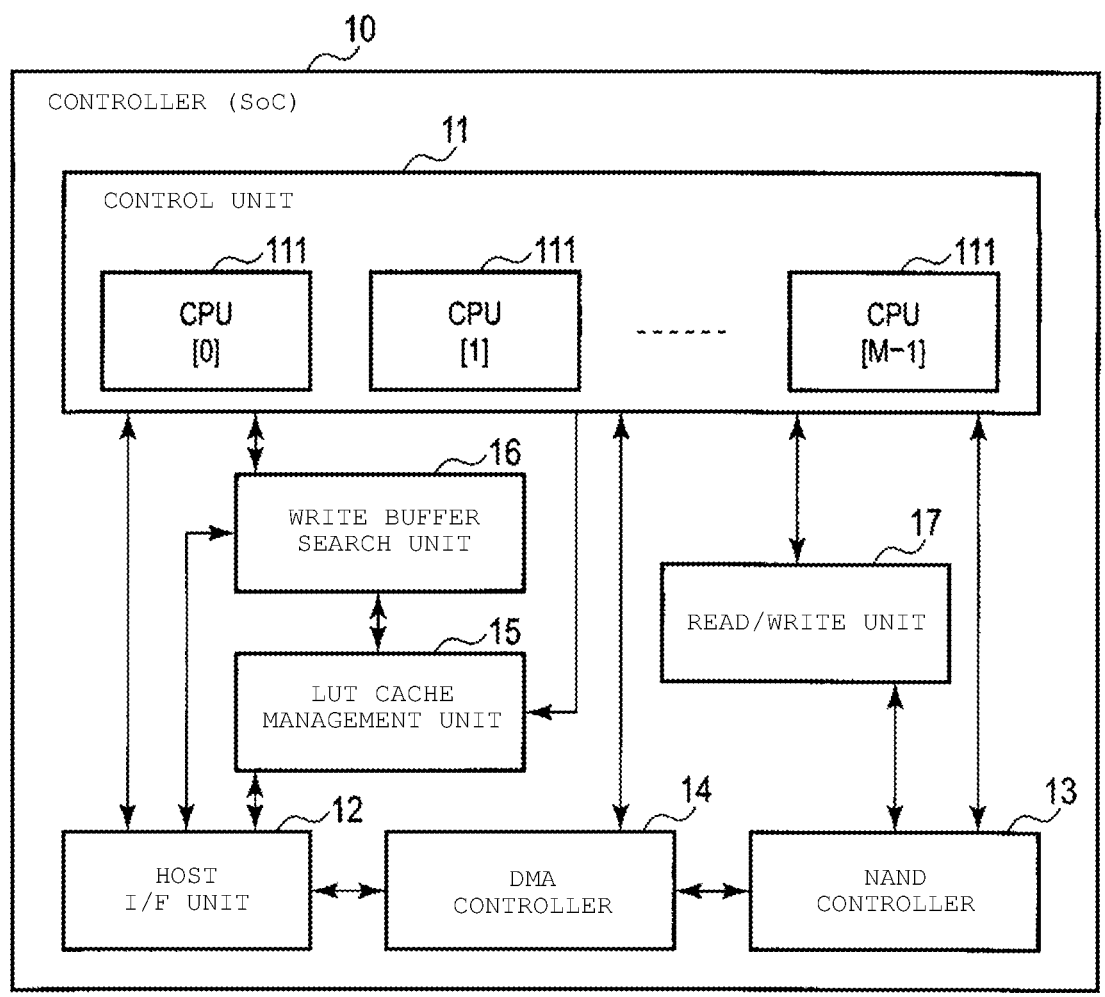
FIG. 2 is a diagram showing a controller in a storage apparatus according to the first embodiment.

FIG. 2 is a diagram showing the controller 10 in the storage apparatus 1.

The controller 10 includes a control unit 11, a host interface (host I/F) unit 12, a NAND controller 13, a Direct Memory Access (DMA) controller 14, a LUT cache management unit 15, a write buffer search unit 16, and a read/write unit 17.

The control unit 11 controls each unit in the storage apparatus 1. The control unit 11 includes, for example, a plurality of CPUs 111. That is, the plurality of CPUs 111 cooperate with each other to control the host interface unit 12, the NAND controller 13, the DMA controller 14, the LUT cache management unit 15, the write buffer search unit 16, and the read/write unit 17. Each of the host interface unit 12, the NAND controller 13, the DMA controller 14, the LUT cache management unit 15, the write buffer search unit 16, and the read/write unit 17 may be an electronic circuit, or may be implemented, for example, by software in such a way that the CPUs 111 executes a program(s) loaded in the controller 10 from the storage device 20.

The host interface unit 12 executes communication between the storage apparatus 1 and the host 2.

The NAND controller 13 executes a data write operation to the storage device 20 and a data read operation from the storage device 20.

The DMA controller 14 controls data transfer between the host interface unit 12 and the NAND controller 13. The DMA controller 14 has a data transfer control function related to the cache control of the LUT 21. The DMA controller 14 reads the LUT stored in the storage device 20 and writes the LUT in the LUT cache 201 or the LUT WB 202 allocated in the DRAM 52 of the host 2. The DMA controller 14 updates the LUT stored in the LUT cache 201 or the LUT WB 202. The DMA controller 14 transfers the LUT between the LUT cache 201 and the LUT WB 202. The DMA controller 14 writes the LUT stored in the LUT WB 202 to the NAND controller 13.

The LUT cache management unit 15 cooperates with the write buffer search unit 16 while using the LUT WB 202 allocated on the DRAM 52 of the host 2 to execute management of the LUT cache 201 also allocated on the DRAM 52 of the host 2. The management of the LUT cache 201 is, for example, to read a part of the LUT 21 necessary for address conversion performed on the logical address of the user data from the storage device 20 and to store the part of the LUT 21 in the LUT cache 201 when the user data is requested to be read from the host 2. Alternatively, the management of the LUT cache 201 is to perform association of the logical address specified by the host 2 with the physical address when the user data is requested to be written. The management of the LUT cache 201 is also referred to as update of the LUT 21.

The write buffer search unit 16 searches the LUT WB 202. For example, the write buffer search unit 16 searches the LUT WB 202 when the host 2 requests user data to be read and the part of the LUT with the logical address of the user data is not in the LUT cache 201. In addition, the write buffer search unit 16 searches the LUT WB 202 when the host 2 requests user data to be written and the part of the LUT with the logical address of the user data is not in the LUT cache 201. If the part of the LUT with the logical address of the user data is found in the search of the LUT WB 202, the address conversion can be performed.

The read/write unit 17 instructs the NAND controller 13 to write the user data to the storage device 20 or read the user data from the storage device 20.

Next, a comparative example of the cache control method for the LUT 21 will be described with reference to FIG. 4.

Here, it is assumed that the LUT cache 201 is an 8-way cache which includes 256 indexes and 8 entries belong to each index. In addition, it is assumed that the LUT 21 is cached in the LUT cache 201 in units of 512 bytes.

The LUT 21 is subdivided in units of 512 bytes and stored in an entry of the LUT cache 201. Hereinafter, each part of the subdivided LUT 21 may be referred to as a LUT table. The entry of the LUT cache 201 in which a particular LUT table is stored is determined based on the logical address corresponding to the LUT table. In addition, an operation of reading the LUT table from the storage device 20 or the LUT WB 202 and writing the LUT table to the LUT cache 201 may be referred to as a refill. Further, an operation of writing the LUT table in the LUT cache 201 or the LUT WB 202 to the storage device 20 may be referred to as a writeback. An operation in which the LUT table in the LUT cache 201 is written to the LUT WB 202 or the LUT table in the LUT WB 202 is written to the storage device 20 for the writeback is also referred to as a flush. An operation of reading the LUT table from one of the LUT cache 201 and the LUT WB 202 and writing the read LUT table to the other is also referred to as copy.

Figure 4:
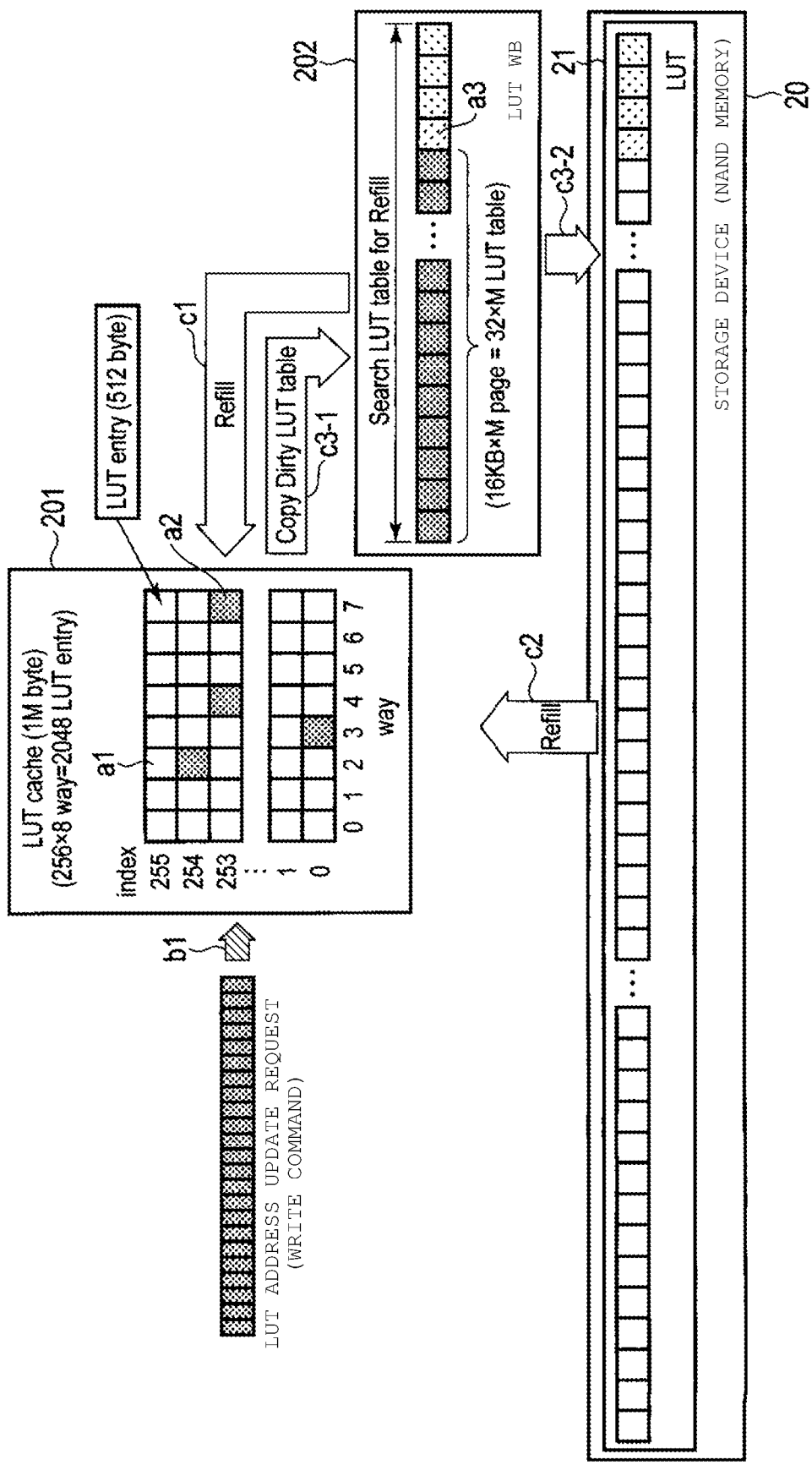
FIG. 4 is a diagram showing a comparative example of a cache control method.

In FIG. 4, an LUT address update request is issued by the host 2 and is accompanied by the update of the LUT 21. Specifically, the LUT address update request is a write command that requests data to be written.

In FIG. 4, an unhatched block labeled with a reference symbol a1 indicates a LUT table whose content matches the LUT 21 on the storage device 20. Such a state of a LUT table may be referred to as clean. In addition, a hatched block labeled with a reference symbol a2 indicates a LUT table which has been updated after being read from the storage device 20 and whose content therefore does not match the LUT 21 on the storage device 20. Such a state of a LUT table may be referred to as dirty. A hatched block labeled with a reference symbol a3 indicates a LUT table which has been transitioned from the dirty state to the clean state by the same content being copied/transferred from the LUT WB 202 to the storage device 20 (more particularly LUT 21).

The entry in the LUT cache 201 that stores a clean LUT table may be referred to as a clean entry. On the other hand, the entry in the LUT cache 201 that stores a dirty LUT table may be referred to as a dirty entry.

The storage apparatus 1 of the comparative example executes the update of the LUT 21 any time the user data is written to the storage device 20 based on the received write command. When updating the LUT 21, the storage apparatus 1 first checks whether the update target part exists in the LUT cache 201. The update target part is the LUT table corresponding to the logical address specified by the received write command. That is, the update target part is the update target LUT table. The storage apparatus 1 checks whether there is an entry storing the update target part in the index determined by the logical address specified by the received write command.

When the update target part already exists in the LUT cache 201, the storage apparatus 1 performs an update of the update target part on the LUT cache 201 according to the LUT address update request (b1). Therefore, the entry for storing the update target part transitions from the clean entry state to the dirty entry state. It is noted that such an update may also be performed on a dirty LUT table already stored in an entry that was previously transferred to the dirty entry state according to a previous update request.

When the update target part does not exist in the LUT cache 201, the storage apparatus 1 next checks whether the update target part exists in the LUT WB 202. To check whether the update target part exists in the LUT WB 202, the storage apparatus 1 refers to LUT tables in the LUT WB 202 in reverse chronological order using a pointer that indicates one of the LUT tables to be checked. In addition, the storage apparatus 1 stores the LUT table in the LUT WB 202 according to the pointer. The storage apparatus 1 also uses another pointer indicating a LUT table which has already been completely written to the storage device 20 in addition to the above pointer. Based on the two pointers, the storage apparatus 1 can refer to only to those LUT tables that have not yet been completely written to the storage device 20.

When the update target part exists in the LUT WB 202, the storage apparatus 1 reads the update target part from the LUT WB 202 and then writes the update target part to the LUT cache 201 (c1). When the update target part is in the LUT WB 202, the update target part is not completely written to the storage device 20 after being read from the LUT cache 201 for the writeback and written to the LUT WB 202. Alternatively, although the update target part is completely written to the storage device 20, the update target part is not evacuated from the LUT WB 202.

When the update target part does not exist in the LUT WB 202, the storage apparatus 1 reads the update target part from the storage device 20 and writes the update target part to the LUT cache 201 (c2). At this time, the storage apparatus 1 writes the update target part to a clean entry in the index determined by the logical address. As a result, the LUT table previously stored in the entry is overwritten on the LUT cache 201. The operation is referred to as "cache out".

The storage apparatus 1, then performs the update of the update target part on the LUT 21 (b1) only after this refill of the update target part in the LUT cache 201 from LUT 21. Therefore, the entry for storing the update target part transitions from the clean entry state to the dirty entry state immediately after the refill and update.

When the LUT cache 201 is refilled with the LUT table and all of the eight entries belonging to the index determined by the logical address are dirty entries, the storage apparatus 1 eventually writes a part or all of the LUT tables stored in the dirty entries to the storage device 20 via the LUT WB 202 (c3_1 and c3_2).

When the write to the storage device 20 is performed in units of m pages (where m is a natural number which is equal to or greater than 2), 32×m LUT tables of the LUT WB 202 are written to the storage device 20. More specifically, the write is performed in units of m pages with respect to the storage device 20 such that 32 LUT tables, each of 512 bytes in size, are stored in a page of 16 Kbytes.

The dirty entry of the LUT cache 201 is written to the LUT WB 202 and transitions to the clean entry once the dirty entry can be read from the LUT WB 202. The LUT table stored in a clean entry can be evacuated from the LUT cache 201.

A LUT table in the dirty state cannot be evacuated from the LUT cache 201. Therefore, when a LUT table, which is in the process of being written back, is further updated on the LUT cache 201, refill of the LUT table does not occur until the writeback of the further updated LUT table is completed. Therefore, even though the writeback for a previous update is being executed, the update of the LUT table can be executed on the LUT cache 201.

In the comparative example, when the update of the LUT 21 is concentrated on a specific index on the LUT cache 201, refill and writeback occur frequently at the specific index. When the update of the LUT table stored in the entry belonging to the specific index occurs frequently, the refill and the writeback of the same LUT table are repeated frequently. Therefore, loads related to the update of the LUT 21 increase, and latency of the storage apparatus 1 may be increased.

In addition, in the comparative example, there is a possibility of a cache out being induced, that is, a LUT table in the LUT cache 201 that may be necessary for a subsequent address conversion is overwritten in a previous refill operation. Therefore, a cache hit rate is caused to be lowered, thereby becoming a factor that also increases the latency of the storage apparatus 1.

In the comparative example, since the update of the LUT 21 is performed on the LUT cache 201, it is not necessary to check the LUT WB 202 when the update target part is found in the LUT cache 201. Even if the update target part exists on the LUT WB 202 for writeback, the dirty state continues with further updates and is not evacuated from the LUT cache 201, and thus address mapping consistency is maintained. However, there is a possibility that the updated target part remaining in the LUT cache 201 hinders refill of another (different) LUT table.

Figure 3:
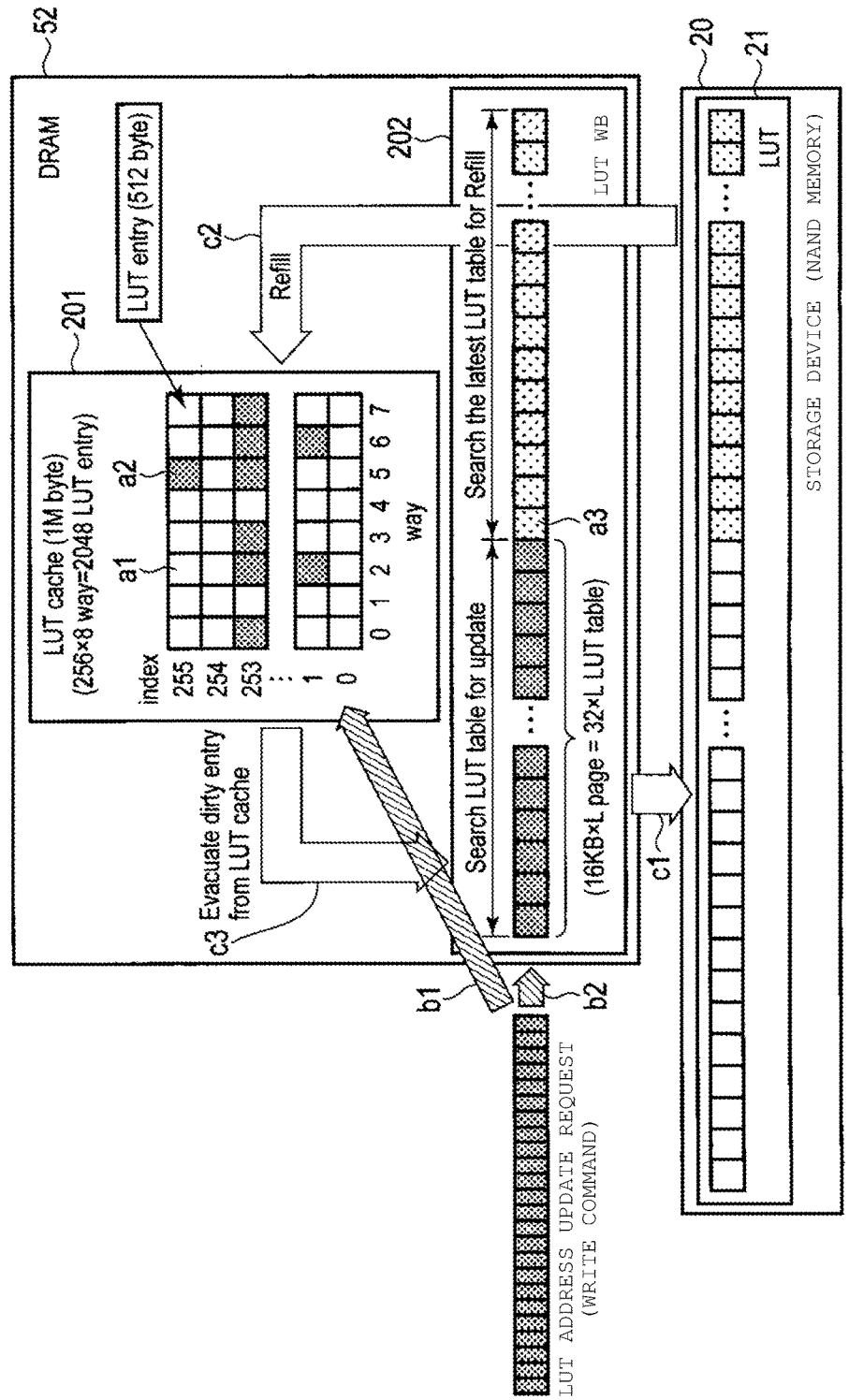
FIG. 3 is a diagram showing a cache control method executed in a storage apparatus according to the first embodiment.

Next, with reference to FIG. 3, a cache control method for the LUT 21 applied to the storage device 1 will be described. In FIG. 3, an unhatched block labeled with reference symbol a1 indicates a clean LUT table. A hatched block labeled with reference symbol a2 indicates a dirty LUT table. A hatched block labeled with a reference symbol a3 indicates a LUT table which has been transitioned from the dirty state to the clean state.

When the storage apparatus 1 writes user data to the storage device 20 by a write command, the storage apparatus 1 changes the physical address which is associated with the logical address specified by the received write command. That is, the storage apparatus 1 executes update of the LUT 21. When the LUT 21 is updated, the LUT cache management unit 15 cooperates with the write buffer search unit 16 to first execute a search of the LUT WB 202. When the update target part is not found, the LUT cache management unit 15 next executes a search of the LUT cache 201.

If the update target part exists in the LUT WB 202 in an update waiting state, the LUT cache management unit 15 performs the update of the update target part directly on the LUT WB 202 (operation b2 in FIG. 3), unlike the comparative example described above which processes updates only via LUT cache 201. In this context, an update waiting state means the LUT table entry is still waiting for a transition from the dirty state to the clean state associated with a copying of a changed LUT table to the LUT 21. When the update target part on the LUT WB 202 is transitioned to the clean state, the LUT cache management unit 15 executes a process of synchronizing the update target part between the LUT WB 202 and the LUT cache 201.

In this way, when the update target part exists in the LUT WB 202 in the update waiting state, the LUT cache management unit 15 performs the update of the update target part on the LUT WB 202. Therefore, the number of LUT tables in the dirty state that can be stored can be increased for each index of the LUT cache 201. Therefore, it is possible to prevent the LUT cache 201 from being frequently refilled with the same LUT table and the same LUT table being written back. Therefore, it is possible to reduce a chance of a cache out of the LUT table necessary for the address conversion for reading the user data. Therefore, it is possible to prevent an increase in command response time due to the refill of the LUT table when reading the user data.

When the update target part does not exist in the LUT WB 202 in the update waiting state, the LUT cache management unit 15 executes the search of the LUT cache 201. When the update target part exists in the LUT cache 201, the LUT cache management unit 15 executes update of the LUT table on the LUT cache 201 (b1).

In the storage apparatus 1, it is possible to prevent the latency of the storage apparatus 1 from increasing. Furthermore, since it is possible to allocate a large size for the LUT WB 202, a reduction in a frequency of the write to the storage device 20 can be accomplished.

It is noted that the LUT table in the dirty state, which exists in the LUT WB 202 in the update waiting state, is written to the storage device 20 when, for example, m pages are accumulated (c1). When the LUT table in the LUT WB 202 transitions to the clean state, the LUT cache management unit 15 executes a process of synchronizing the LUT tables existing in both the LUT cache 201 and the LUT WB 202.

In addition, when the update target part does not exist in the LUT cache 201 and exists in the LUT WB 202 in the update waiting state, the LUT cache management unit 15 does not perform refill from the LUT WB 202 to the LUT cache 201 and executes update for only the LUT WB 202.

When the update target part is required to read data, an update process on the LUT WB 202 is completed, a refill range of the LUT cache 201 is updated, and, thereafter, the LUT cache 201 is refilled. That is, the storage apparatus 1 employs a cache control method for the LUT 21, which is generally known for reading user data. The cache control method for the LUT 21 is, specifically, to search the LUT cache 201 and refill from the LUT WB 202 or the storage device 20 when the update target part does not exist.

When the update target part does not exist in the LUT cache 201 and does not exist in the LUT WB 202 in the update waiting state, the LUT cache management unit 15 refills the LUT cache 201 (c2). When the update target part exists in the LUT WB 202 in the update waiting state, the LUT cache management unit 15 reads the update target part from the LUT WB 202 and writes the update target part to the LUT cache 201. In addition, when the update target part does not exist in the LUT WB 202 in the update waiting state, the LUT cache management unit 15 reads the update target part from the storage device 20 and writes the update target part to the LUT cache 201. The LUT cache management unit 15 performs the update of the update target part of the refilled LUT table in the LUT cache 201 (b1). It is noted that a search range for the refill, which is shown in the LUT WB 202 in FIG. 3, is different from a search range for update when searching for the update target part in a case of writing the user data. The LUT table which is currently updated is excluded from a refill target of the LUT cache 201.

In addition, when an index, to which the LUT table that is an update or reference target in the LUT cache 201 belongs, is filled with the dirty entries, and entries for the refill cannot be assigned, that is, when all of the eight entries belonging to the index are the dirty entries and a new refill request is generated in a state in which there is no clean entry for refilling the new LUT table, the LUT cache management unit 15 writes a part or all of the dirty entries to the LUT WB 202 (c3). In the storage apparatus 1, the LUT cache management unit 15 causes the dirty entries to transition to the clean entries at that time.

Figure 5:
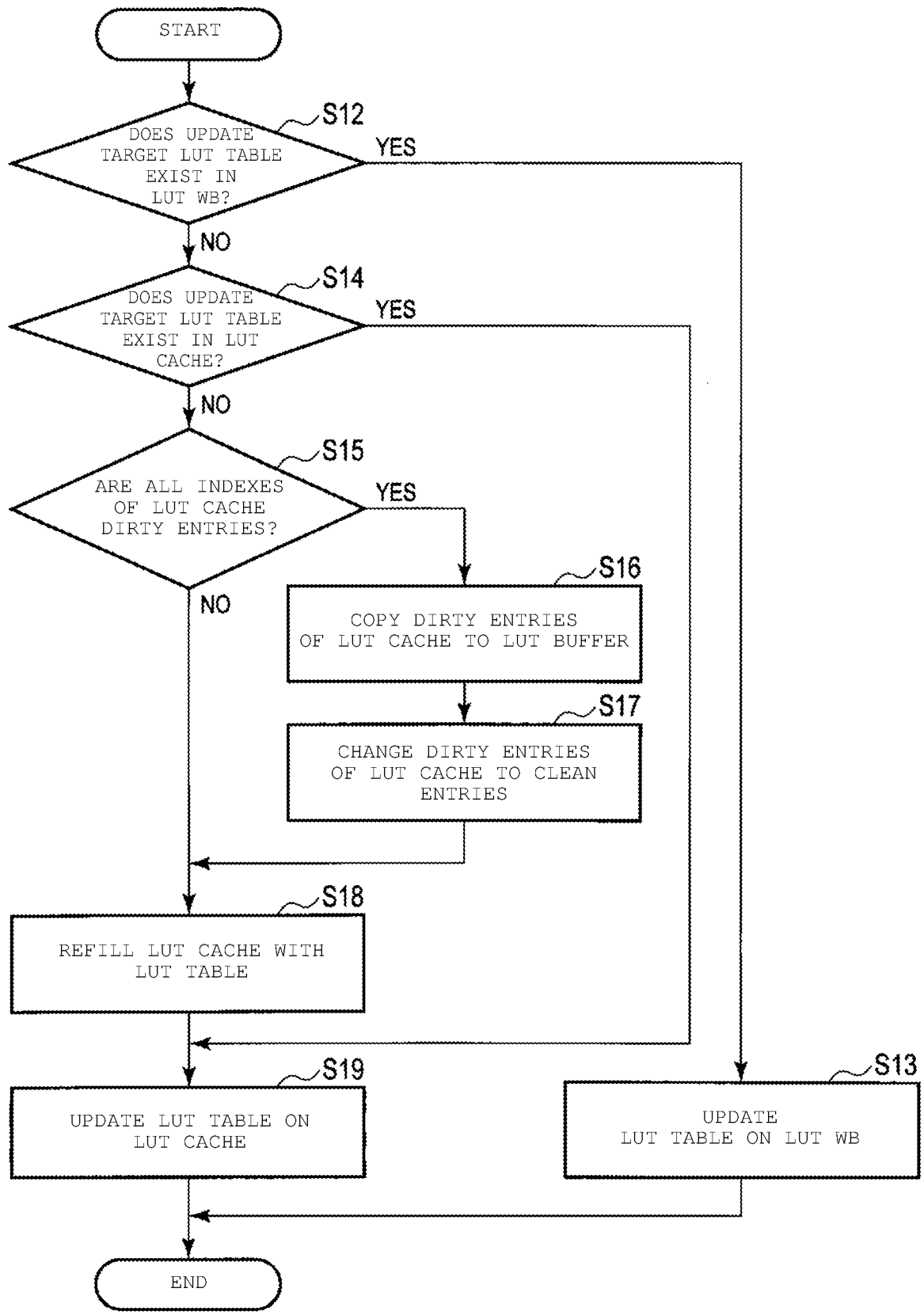
FIG. 5 is a flowchart of a procedure of updating an LUT in the storage apparatus according to the first embodiment.

FIG. 5 is a flowchart of a procedure of updating the LUT 21 in the storage apparatus 1.

When the write command is received from the host 2, the storage apparatus 1 determines whether the update target LUT table, which is the LUT table corresponding to the logical address included in the received write command, exists in the LUT WB 202 (S12).

When the update target LUT table exists in the LUT WB 202 (S12: YES), the storage apparatus 1 updates the update target LUT table on the LUT WB 202 (S13), and ends a process of updating the LUT table.

When the update target LUT table does not exist in the LUT WB 202 (S12: NO), the storage apparatus 1 determines whether the update target LUT table exists in the LUT cache 201 (S14).

When the update target LUT table exists in the LUT cache 201 (S14: YES), the storage apparatus 1 updates the update target LUT table existing in the LUT cache 201 (S19), and ends the process of updating the LUT table.

When the update target LUT table does not exist in the LUT cache 201 (S14: NO), the storage apparatus 1 checks whether a target index, which is an index of the LUT cache 201 determined by the logical address included in the received write command, is filled with the dirty entry (S15).

When the target index is filled with the dirty entry (S15: YES), the storage apparatus 1 copies the LUT table stored in the dirty entry belonging to the target index to the LUT WB 202 (S16). In addition, the storage apparatus 1 causes the dirty entry belonging to the target index to be transferred to the clean entry (S17).

After causing the dirty entry belonging to the target index to transition to the clean entry, the storage apparatus 1 reads the update target LUT table from the storage device 20 and stores the update target LUT table in the LUT cache 201 (S18). Further, the storage apparatus 1 updates the update target LUT table existing in the LUT cache 201 (S19), and ends the process of updating the LUT table.

When the target index is not filled with the dirty entry (S15: NO), the storage apparatus 1 reads the update target LUT table from the storage device 20 and stores the update target LUT table in the LUT cache 201 (S18). Further, the storage apparatus 1 updates the update target LUT table existing in the LUT cache 201 (S19), and ends the process of updating the LUT table.

Figure 6:
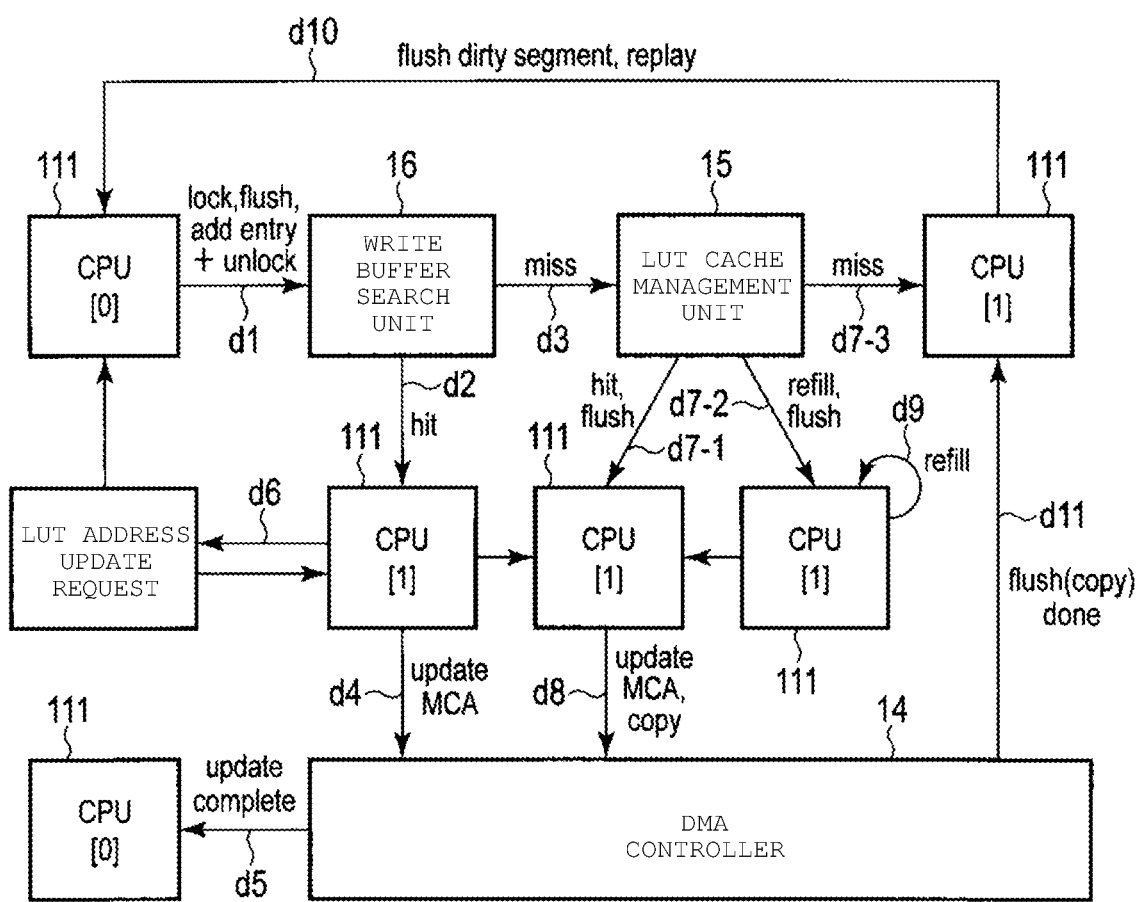
FIG. 6 is a diagram depicting aspects related to an update of the LUT of a storage apparatus according to a first embodiment.

FIG. 6 is a diagram showing how to update the LUT 21 of the storage apparatus 1. Here, it is assumed that two CPUs 111 (CPU[0] and CPU[1]) of the plurality of CPUs 111 in the controller 10 perform the update of the LUT 21.

For example, when a LUT address update request, which is a write command, is received from the host 2, the CPU[0] 111 of the controller 10 issues, to the write buffer search unit 16, an instruction to search the LUT WB 202 and determine whether the LUT table corresponding to the logical address specified by the host 2 exists in the LUT WB 202 (d1).

When the LUT table exists in the LUT WB 202, the write buffer search unit 16 provides a notification that the LUT table exists in the LUT WB 202 to the CPU[1] 111 (d2). In addition, when the LUT table does not exist in the LUT WB 202, the write buffer search unit 16 issues to the LUT cache management unit 15 an instruction to search the LUT cache 201 and determine whether the LUT table exists in the LUT cache 201 (d3).

The CPU[1] 111, which has detected the notification issued by the write buffer search unit 16, updates the LUT table on the LUT WB 202, which corresponds to the logical address specified by the host 2 in the LUT address update request, using the DMA controller 14 (d4).

When the DMA controller 14 completes the update of the LUT table instructed by the CPU[1] 111, the DMA controller 14 provides a notification of the completion to the CPU[0] 111 (d5).

In addition, the CPU[1] 111 refers to the LUT address update request in order to acquire the logical address, physical address, or the like, which is specified when instructing the DMA controller 14 to update the LUT table (d6).

The LUT cache management unit 15 issues various instructions or notifications to the CPU[1] 111 based on a search result of the LUT table (d7_1, d7_2, d7_3).

When the LUT table exists in the LUT cache 201, the LUT cache management unit 15 issues to the CPU[1] 111 an instruction to update the LUT table in the LUT cache 201 (d7_1). The CPU[1] 111 that has been instructed to update the LUT table in the LUT cache 201 updates the LUT table in the LUT cache 201 using the DMA controller 14 (d8). When the DMA controller 14 completes the update of the LUT table instructed by the CPU[1] 111, the DMA controller 14 provides a notification of the completion to the CPU[0] 111 (d5).

When the LUT table does not exist in the LUT cache 201, the LUT cache management unit 15 provides a notification that the update target LUT table does not exist in the LUT cache 201 to the CPU[1] 111 (d7_2). The CPU[1] 111, which has detected the notification that the update target LUT table does not exist in the LUT cache 201 from the LUT cache management unit 15, executes the refill with the update target LUT table from the storage device 20 to the LUT cache 201 (d9). When the refill is completed, the CPU[1] 111 gives an instruction to retry the update of the LUT to the CPU[0] 111 (d10). When the retry is performed, the LUT cache 201 is refilled with the update target LUT table, and thus the update of the LUT table is performed on the LUT cache 201.

Further, when all of the entries of the target index are the dirty entries and the entry for the refill is not newly allocated, the LUT cache management unit 15 gives an instruction to writeback the dirty entries to the CPU[1] 111 (d7_3). The CPU[1] 111 cooperates with the CPU[0] to execute the instructed writeback using the DMA controller 14 for all of the dirty entries of the index (d8). Whenever the DMA controller 14 completes the write of the LUT table in the LUT cache 201 to the LUT WB 202 for the writeback, the DMA controller 14 provides a notification of the completion to the CPU[1] 111 (d11).

As described above, in the storage apparatus 1, even when update of the LUT 21 frequently occurs on a specific index, and update of the same LUT table to be stored in the entry belonging to the specific index frequently occurs, the update can be handled only by repeatedly updating the LUT table on the LUT WB 202. That is, it is possible to prevent the latency of the storage apparatus 1 from increasing. Furthermore, since it is possible to allocate a large size for the LUT WB 202, a reduction in a frequency of the write to the storage device 20 can be accomplished.

In addition, in the storage apparatus 1, when the update of the LUT 21 in the LUT cache 201 is performed and the index to which the update target LUT table belongs is filled with dirty entries, that is, when all of the eight entries belonging to the index are dirty entries and there is no clean entry to refill a new LUT table, the entries transition to the clean entries by writing a part or all of the dirty entries to the LUT WB 202. Therefore, it is possible to prevent the latency of the storage apparatus 1 from increasing due to a delay of the refill when the data is requested to be read.

Next, a second embodiment will be described. It is assumed that the storage apparatus 1 is an SSD equipped with a NAND memory. The configuration may be the same as the storage apparatus 1 described with reference to FIG. 1. Therefore, description related to the configuration of the storage apparatus 1 will not be repeated. In addition, the same reference numerals are used with respect to the same components.

Figure 7:
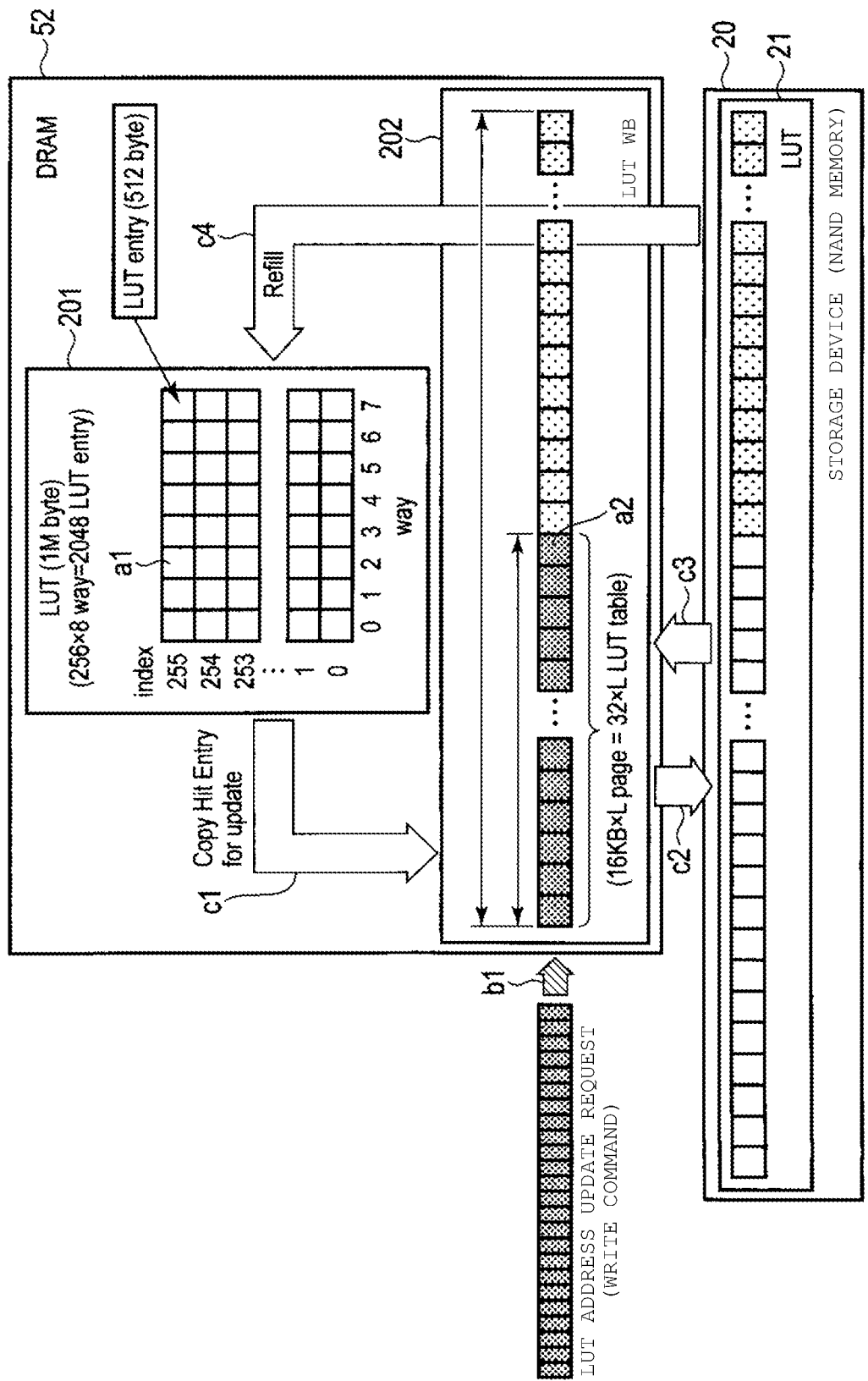
FIG. 7 is a diagram showing a cache control method for a LUT executed in a storage apparatus according to a second embodiment.

FIG. 7 is a diagram showing a method in which the LUT cache management unit 15 in the storage apparatus 1 cooperates with the write buffer search unit 16 to perform cache control for the LUT 21 while using the LUT cache 201 and the LUT WB 202. In FIG. 7, an unhatched block labeled with a reference symbol a1, a hatched block labeled with a reference symbol a2, and a hatched block labeled with a reference symbol a3 respectively indicate a clean LUT table, a dirty LUT table, and a LUT table, which has been transitioned from the dirty state to the clean state.

The storage apparatus 1 executes control of the LUT cache 201 such that the entries on the LUT cache 201 are normally maintained in the clean state.

When the user data is written to the storage device 20 according to the write command from the host 2, the LUT cache management unit 15 cooperates with the write buffer search unit 16 to search both the cache 201 and the LUT WB 202 for the update target LUT table.

When the update target part exists in the LUT cache 201, the LUT cache management unit 15 executes read from the LUT cache 201 and write to the LUT WB 202 in order to copy the update target part (c1). The LUT cache management unit 15 performs the update of the update target part on the LUT WB 202 (b1).

Even when the update target part does not exist in the LUT cache 201 and exists in the LUT WB 202 in the update waiting state, the LUT cache management unit 15 updates the update target part on the LUT WB 202 (b1). The LUT cache management unit 15 does not refill the LUT table being updated from the LUT WB 202 to the LUT cache 201. If the update target part is needed to read the user data, there is no problem because the LUT cache 201 is refilled after the update of the LUT table is completed. The search range for refill in the LUT WB 202 when the user data is read, is the LUT table in a state of being written to the storage device 20 on the LUT WB 202.

It is noted that the dirty LUT table existing in the LUT WB 202 in the update waiting state is written to the storage device 20 after the updating process is completed at the timing when L pages are accumulated (c2).

If the update target part does not exist in the LUT cache 201 and does not exist in the LUT WB 202 in the update waiting state, the LUT cache management unit 15 executes the refill to the LUT WB 202 instead of the LUT cache 201. (c3). Then, the LUT cache management unit 15 performs the update of the update target part on the LUT WB 202 (b1).

As described above, in the storage apparatus 1, the refill (c4) from the storage device 20 to the LUT cache 201 occurs only when the user data is read. Therefore, in the storage apparatus 1, as compared with the case of updating the LUT table on the LUT cache 201, the synchronization process is not necessary when writing back the dirty entry from the LUT cache 201, and thus the control of the LUT 21 becomes simple. For example, it is not necessary to perform the control for moving the LUT table in the dirty state from the LUT cache 201 to the write LUT WB 202 at the time of writing back the LUT table.

In addition, even when the update target LUT table does not exist in either the LUT cache 201 or the LUT WB 202, the storage apparatus 1 does not copy the target LUT table from the storage device 20 to the LUT cache 201. Thus, a cache out that overwrites the LUT table in the LUT cache 201 does not occur at all. Therefore, it is possible to prevent the increase in the command response time due to the refill of the LUT table when reading the data.

In addition, in the storage apparatus 1 that performs the update of the LUT table on the LUT WB 202, even when the update of the LUT 21 frequently occurs on the specific index on the LUT cache 201, and the update of the same LUT table to be stored in the entry belonging to the specific index frequently occurs, the situation can be handled only by repeatedly updating the LUT table on the LUT WB 202. That is, it is possible to prevent the latency of the storage apparatus 1 from increasing. Furthermore, since the number of LUT tables that can be stored as a whole of the storage apparatus 1 can be increased, a reduction in a frequency of the write to the storage device 20 can be accomplished.

Figure 8:
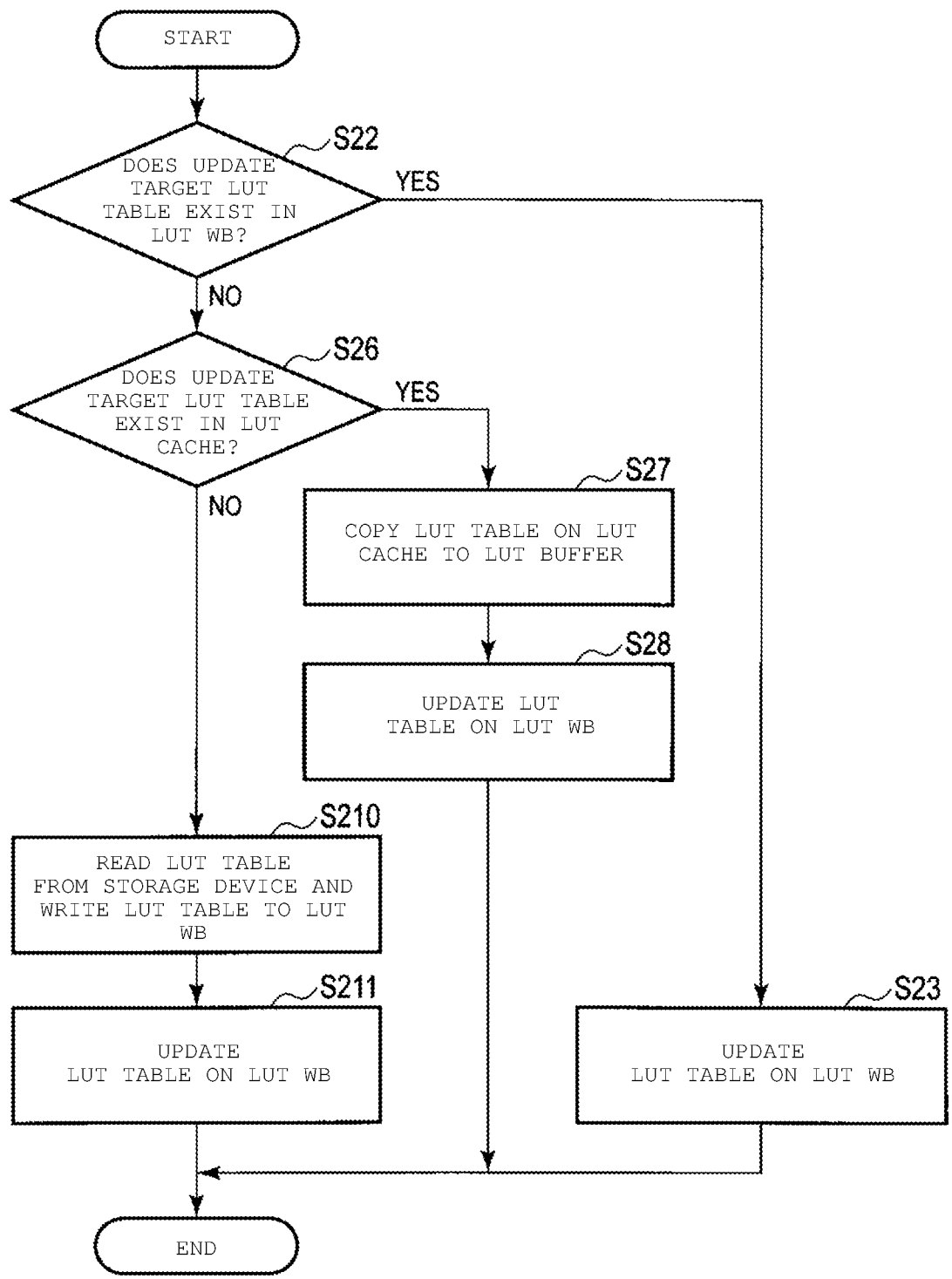
FIG. 8 is a flowchart of a procedure of updating the LUT in a storage apparatus according to a second embodiment.

FIG. 8 is a flowchart of a procedure of updating the LUT 21 in the storage apparatus 1.

When the write command is received from the host 2, the storage apparatus 1 determines whether the update target LUT table, which is the LUT table corresponding to the logical address included in the received write command, exists in the LUT WB 202 (S22).

When the update target LUT table exists in the LUT WB 202 (S22: YES), the storage apparatus 1 updates the update target LUT table in the LUT WB 202 (S23), and ends the process of updating the LUT table.

When the update target LUT table does not exist in the LUT WB 202 (S22: NO), the storage apparatus 1 determines whether the update target LUT table exists in the LUT cache 201 (S26).

When the update target LUT table exists in the LUT cache 201 (S26: YES), the storage apparatus 1 copies the update target LUT table in the LUT cache 201 to the LUT WB 202 (S27). The storage apparatus 1 updates the update target LUT table in the LUT WB 202 (S28), and ends the process of updating the LUT table.

When the update target LUT table does not exist in the LUT cache 201 (S26: NO), the storage apparatus 1 reads the update target LUT table from the storage device 20 and writes the update target LUT table to the LUT WB 202 (S210). That is, the storage apparatus 1 executes the refill from the storage device 20 to the LUT WB 202. The storage apparatus 1 updates the update target LUT table in the LUT WB 202 (S211), and ends the process of updating the LUT table.

Figure 9:
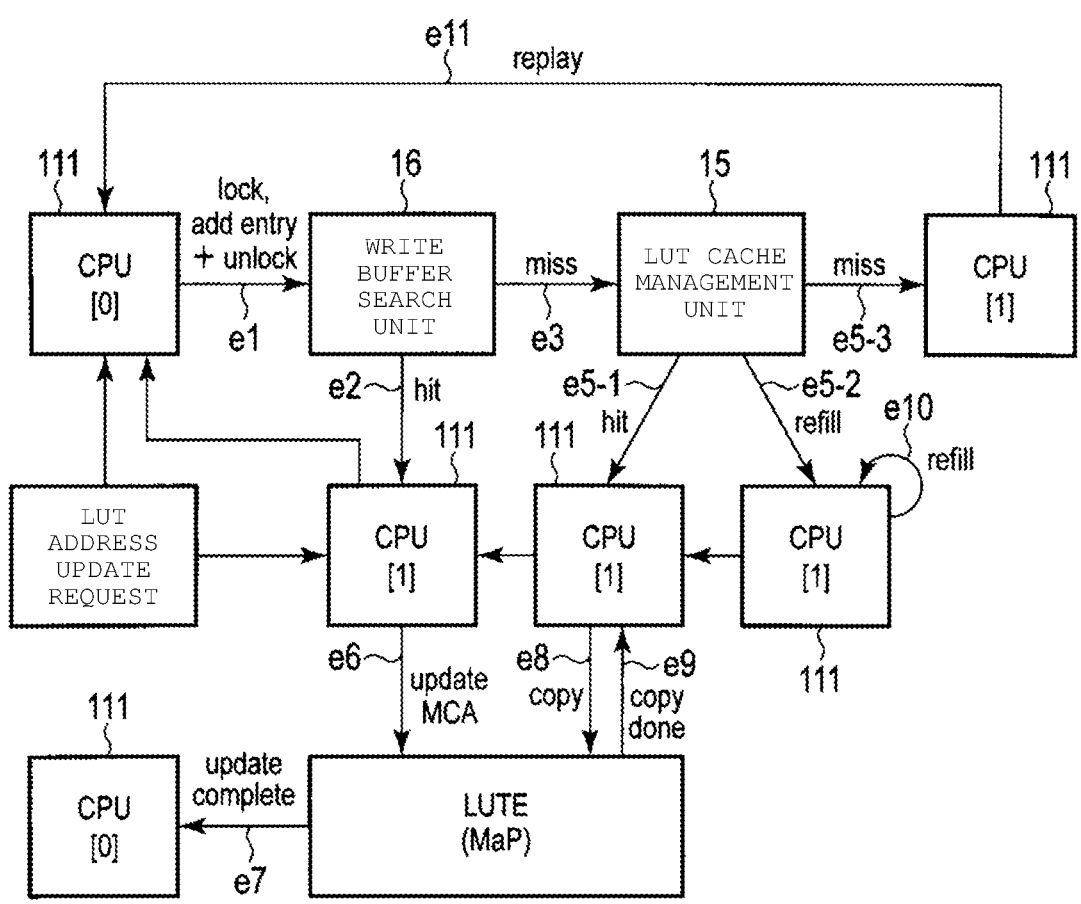
FIG. 9 is a diagram depicting aspects related to an update a LUT of a storage apparatus according to the second embodiment.

FIG. 9 is a diagram showing how to update the LUT 21 of the storage apparatus 1. Here, it is assumed that two CPUs 111 (CPU[0] and CPU[1]) of the plurality of CPUs 111 in the controller 10 perform the update of the LUT 21.

For example, when a LUT address update request, which is a write command, is received from the host 2, the CPU[0] 111 of the controller 10 issues to the write buffer search unit 16 an instruction to search the LUT WB 202 and determine whether the LUT table corresponding to the logical address specified by the host 2 exists in the LUT WB 202 (e1). When the LUT table exists in the LUT WB 202, the write buffer search unit 16 provides a notification that the LUT table exists in the LUT WB 202 to the CPU[1] 111 (e2). In addition, when the LUT table does not exist in the LUT WB 202, the write buffer search unit 16 issues to the LUT cache management unit 15 an instruction to search the LUT cache 202 and determine whether the LUT table exists in the LUT cache 201 (e3).

The LUT cache management unit 15 issues various instructions to the CPU[1] 111 based on the search result of the LUT table (e5_1, e5_2, e5_3).

For example, when the LUT table does not exist in the LUT WB 202 and exists in the LUT cache 201, the LUT cache management unit 15 issues to the CPU[1] 111 an instruction to copy the LUT table on the LUT cache 201 to the LUT WB 202 and to perform the update on the LUT WB 202 (e5_1).

When the LUT table does not exist in the LUT WB 202 and also does not exist in the LUT cache 201, the LUT cache management unit 15 instructs to refill the LUT WB 202 with the update target LUT table from the storage device 20 (e5_2).

When the update target LUT table exists on the LUT WB 202 but does not exist on the LUT cache 201, the CPU[1] 111 detects only a notification (e2) from the write buffer search unit 16. In this case, the CPU[1] 111 executes the update of the LUT table on the LUT WB 202 using the DMA controller 14 (e6). When the DMA controller 14 completes the update of the LUT table instructed from the CPU[1] 111, the DMA controller 14 provides a notification of the completion to the CPU[0] 111 (e7).

In addition, when the update target LUT table exists in both the LUT WB 202 and the LUT cache 201, the CPU[1] 111 detects the notification (e2) issued by the write buffer search unit 16. In this case, the CPU[1] 111 executes the update of the LUT table on the LUT WB 202 using the DMA controller 14 (e6). When the DMA controller 14 completes the update and the copy of the LUT table instructed from the CPU[1] 111, the DMA controller 14 provides the notification of the completion to the CPU[0] 111 (e7).

When the update target LUT table does not exist on the LUT WB 202 and exists on the LUT cache 201, the CPU[1] 111 detects an instruction to copy the LUT table on the LUT cache 201 to the LUT WB 202 and to update the LUT table on the LUT WB 202 from the LUT cache management unit 15 (e5-1). In this case, the CPU[1] 111 executes the copy of the LUT table in the LUT cache 201 to the LUT WB 202 and the update of the LUT table in the LUT WB 202, as instructed by the LUT cache management unit 15, using the DMA controller (e6 and e8). When the DMA controller 14 completes the update of the LUT table instructed from the CPU[1] 111, the DMA controller 14 provides a notification of the completion to the CPU[0] 111 (e7).

In addition, when the update target LUT table does not exist in the LUT WB 202 and also does not exist in the LUT cache 201, the CPU[1] 111 detects an instruction to refill the LUT WB 202 with the update target LUT table from the storage device 20 (e5-2). The CPU[1] 111, which detects the instruction, executes the instructed refill using the DMA controller 14 (e10 and e8). In addition, the CPU[1] 111, which detects a notification that the update target LUT table does not exist in the LUT cache 201 and the entry for the refill has no free space from the LUT cache management unit 15 (e5_3), issues an instruction to retry the update of the LUT to the CPU[0] 111 (e11). When the entry for the refill ha a space due to completion of a preceding refill process and retry is performed, the LUT WB 202 can be refilled with the update target LUT table.

As described above, in the storage apparatus 1, the refill from the storage device 20 to the LUT cache 201 occurs only when data is read. Therefore, it is not necessary to perform a process of dynamically switching the LUT table of an update destination when the dirty entry is written back from the LUT cache 201, and thus the control of the LUT 21 is simplified.

In addition, the storage apparatus 1 does not cache out the LUT table when updating the LUT 21. Thus it is possible to prevent the increase in the command response time due to the refill of the LUT table when the data is read.

Further, also in the storage apparatus 1, even when the update of the LUT 21 frequently occurs on the specific index on the LUT cache 201, and the update of the same LUT table to be stored in the entry belonging to the specific index frequently occurs, the situation can be handled only by repeatedly updating the LUT table on the LUT WB 202. That is, it is possible to prevent the latency of the storage apparatus 1 from increasing. Furthermore, since the number of LUT tables that can be stored as a whole of the storage apparatus 1 can be increased, a reduction in a frequency of the write to the storage device 20 can be accomplished.

Figure 10:
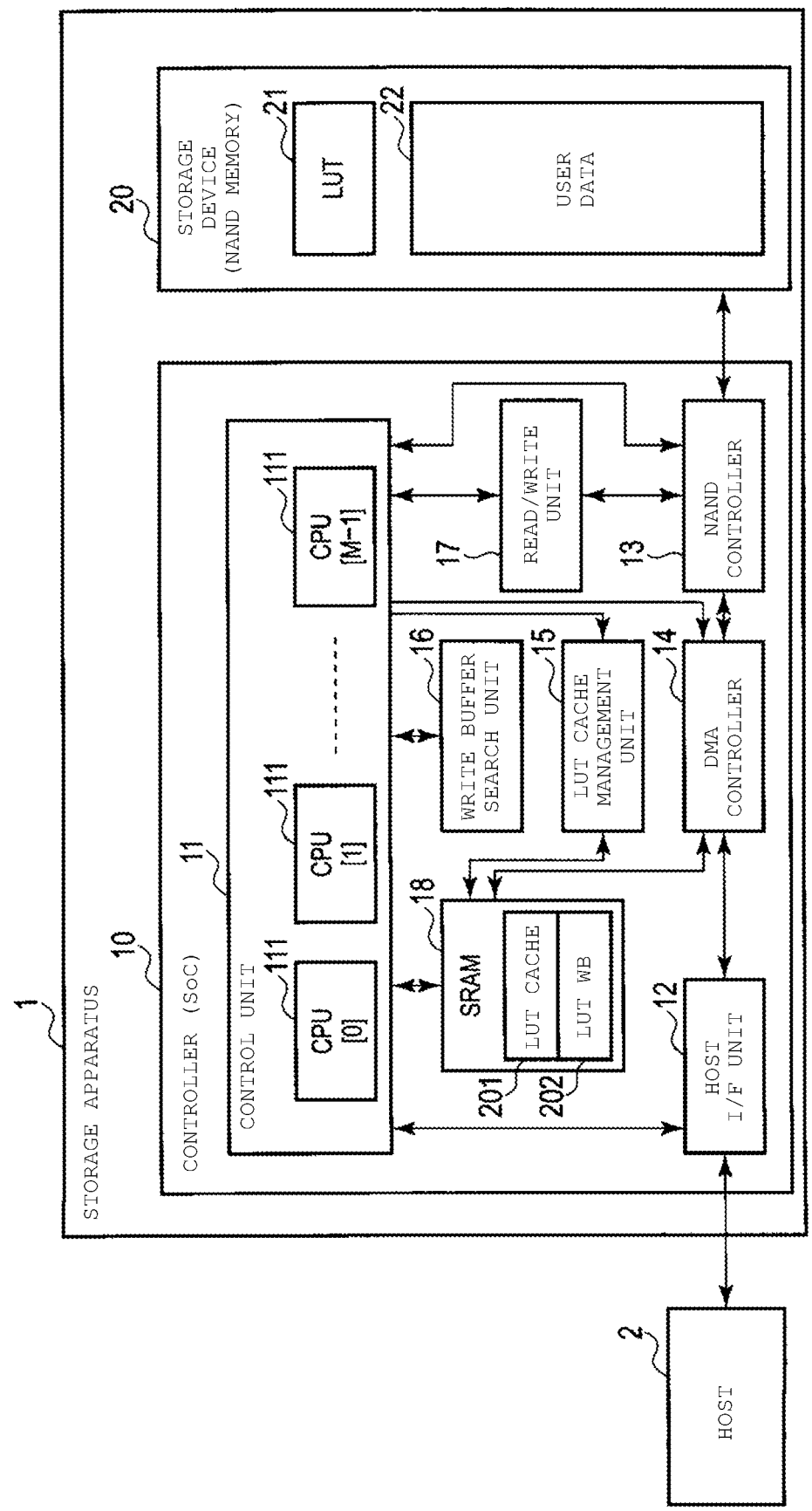
FIG. 10 is a diagram showing a storage apparatus according to a third embodiment.

Next, a third embodiment will be described. FIG. 10 is a diagram showing a storage apparatus 1 according to the third embodiment. It is assumed that the storage apparatus 1 is also an SSD equipped with a NAND memory. The same reference numerals are used with respect to the same components, and the same description will not be repeated.

As shown in FIG. 10, in the storage apparatus 1, the controller 10 includes an SRAM 18. The SRAM 18 is a high-speed memory rather than the storage device 20 which is the NAND memory. The SRAM 18 does not necessarily have to have an enough capacity to store the entire LUT 21. Furthermore, the storage apparatus 1 allocates the LUT cache 201 and the LUT WB 202, which are allocated in the DRAM 52 on a side of the host 2 in the aforementioned embodiments, on the SRAM 18. The storage apparatus 1 allocates the LUT cache 201 and the LUT WB 202 on the SRAM 18 to execute the cache control of the LUT 21 or the cache control of the LUT 21 described above.

It is noted that the configuration of the storage apparatus 1 in FIG. 1 indicates that the LUT cache 201 and the LUT WB 202 are allocated in the DRAM 52 in the host 2, but is not intended to indicate that the storage apparatus 1 does not include the SRAM 18. For example, when the LUT cache 201 and the LUT WB 202 cannot be allocated in the DRAM 52 of the host 2, the LUT cache 201 and the LUT WB 202 may be allocated in the SRAM 18 of the storage apparatus 1 to execute the cache control of the LUT 21. In addition, it may be possible to choose whether to allocate the LUT cache 201 and the LUT WB 202 in the DRAM 52 of the host 2 or to allocate the LUT cache 201 and the LUT WB 202 in the SRAM 18 of the storage apparatus 1.

In the storage apparatus 1, even when the update of the LUT 21 frequently occurs on the specific index, and the update of the same LUT table to be stored in the entry belonging to the specific index frequently occurs, it is possible to prevent the latency of the storage apparatus 1 from increasing. In addition, since the number of LUT tables that can be stored as the whole of the storage apparatus 1 can be increased, a reduction in a frequency of the write to the storage device 20 can be accomplished.

Furthermore, when the update of the LUT 21 is performed on the LUT cache 201 and the index to which the update target LUT table belongs is filled with dirty entries, the dirty entries are transferred to the clean entries by writing a part or all of the dirty entries to the LUT WB 202. When the LUT WB 202 having a large size, it is possible to prevent the latency of the storage apparatus 1 from increasing due to a delay of the refill.

In addition, when the cache control for the LUT 21 described in FIGS. 8 and 9 is employed, the refill from the storage device 20 to the LUT cache 201 occurs only when reading the user data, and thus the synchronization process is not necessary when writing back the dirty entry from the LUT cache 201, and the control of the LUT 21 becomes simple. In addition, since a cache out of the LUT table necessary for the address resolution for reading the user data in order to update the LUT 21 is not required, it is possible to prevent the increase in the command response time due to refills of the LUT table when reading the user data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus, comprising:
   a storage device that stores a conversion table that maps a logical address to a physical address of the storage device; and
   a controller configured to manage the conversion table and control write of data to the storage device and read of the data from the storage device according to a request from a host, wherein
   the controller is further configured to:
      allocate, in a memory of the host or the storage apparatus, a cache area, for temporarily storing a part of the conversion table, and a write buffer area, for storing a part of the conversion table that has been updated by the host and is to be written to the storage device,
      upon receipt of a request that requires update of the conversion table from the host, determine whether a first part of the conversion table to be updated is in the write buffer area,
      upon determining that the first part is in the write buffer area, update the first part in the write buffer area according to the request,
      upon determining that the first part is not in the write buffer area, determine whether the first part is in the cache area, and
      when the first part is not in either the cache area or the write buffer area, write the first part stored in the storage device to the cache area, and update the first part in the cache area according to the request.

2. The storage apparatus according to claim 1, wherein the controller is further configured to, after updating the first part in the write buffer area:
   write the updated first part stored in the write buffer area to the storage device, and
   when the cache area stores the first part that has not been updated, write the updated first part to the cache area.

3. The storage apparatus according to claim 1, wherein the controller is further configured to:
   when the first part is not in the write buffer area but in the cache area, update the first part in the cache area according to the request.

4. The storage apparatus according to claim 1, wherein the controller is further configured to, when the first part is in both the cache area and the write buffer area, update the first part in the write buffer area according to the request, and then write the updated first part to the cache area.

5. The storage apparatus according to claim 1, wherein the controller is further configured to, when the first part is in the cache area but not in the write buffer area, write the first part stored in the cache area to the write buffer area, update the first part in the write buffer area according to the request, and then write the updated first part to the cache area.

6. The storage apparatus according to claim 1, wherein the controller is further configured to:
   upon receipt of a request from the host, determine whether a second part of the conversion table to be referred to according to the request is in the cache area and the write buffer area,
   upon determining that the second part is in the write buffer area but not in the cache area, write the second part stored in the write buffer area to the cache area, and
   upon determining that the second part is not in either the write buffer area or the cache area, write the second part stored in the storage device to the cache area.

7. The storage apparatus according to claim 1, wherein the cache area is allocated in a dynamic random access memory of the host as a set associative cache.

8. The storage apparatus according to claim 1, wherein the cache area and the write buffer area are allocated in a static random access memory of the storage apparatus.

9. A control method for a cache of a conversion table that maps a logical address to a physical address of a storage device, the control method comprising:
   allocating in a memory a cache area for temporarily storing a part of the conversion table and a write buffer area for storing a part of the conversion table that has been updated by a host and is to be written to the storage device;
   upon receipt of a request that requires update of the conversion table from the host, determining whether a first part of the conversion table to be updated is in the write buffer area;
   upon determining that the first part is in the write buffer area, updating the first part in the write buffer area according to the request;
   upon determining that the first part is not in the write buffer area, determining whether the first part is in the cache area; and
   when the first part is not in either the cache area or the write buffer area, writing the first part stored in the storage device to the cache area, and updating the first part in the cache area according to the request.

10. The control method according to claim 9, further comprising, after updating the first part in the write buffer area:
    writing the updated first part stored in the write buffer area to the storage device; and
    when the cache area stores the first part that has not been updated, writing the updated first part to the cache area.

11. The control method according to claim 9, further comprising:
    when the first part is not in the write buffer area but in the cache area, updating the first part in the cache area according to the request.

12. The control method according to claim 9, further comprising:
    when the first part is in both the cache area and the write buffer area, updating the first part in the write buffer area according to the request, and then writing the updated first part to the cache area.

13. The control method according to claim 9, further comprising:
    when the first part is in the cache area but not in the write buffer area, writing the first part stored in the cache area to the write buffer area, updating the first part in the write buffer area according to the request, and then writing the updated first part to the cache area.

14. The control method according to claim 9, further comprising:
    upon receipt of a request from the host, determining whether a second part of the conversion table to be referred to according to the request is in the cache area and the write buffer area;
    upon determining that the second part is in the write buffer area but not in the cache area, writing the second part stored in the write buffer area to the cache area; and
    upon determining that the second part is not in either the write buffer area or the cache area, writing the second part stored in the storage device to the cache area.

15. The control method according to claim 9, wherein the cache area includes a plurality of regions each storing a plurality of parts of the conversion tables, and
    the method further comprises, when one of the regions is filled with at least one of a part of the conversion table that is inconsistent with the conversion table stored in the storage device, or a part of the conversion table that is being read from the storage device, writing the inconsistent part of the conversion table to the write buffer area, and marking the inconsistent part of the conversion table as a part of the conversion table that is consistent with the conversion table stored in the storage device.

16. A storage system, comprising:
    a host that includes a memory; and
    a storage apparatus that includes:
       a storage device that stores a conversion table that maps a logical address to a physical address of the storage device; and
       a controller configured to manage the conversion table and control write of data to the storage device and read of the data from the storage device according to a request from the host, wherein
    the controller is further configured to:
       allocate, in the memory of the host, a cache area for temporarily storing a part of the conversion table, and a write buffer area for storing a part of the conversion table that has been updated by the host and is to be written to the storage device,
       upon receipt of a request that requires update of the conversion table from the host, determine whether a first part of the conversion table to be updated exists in the write buffer area,
       upon determining that the first part exists in the write buffer area, update the first part in the write buffer area according to the request,
       upon determining that the first part is not in the write buffer area, determine whether the first part is in the cache area, and
       when the first part is not in either the cache area or the write buffer area, write the first part stored in the storage device to the cache area, and update the first part in the cache area according to the request.

* * * * *